United States Patent [19]

Gasaway

[11] Patent Number: 5,301,709
[45] Date of Patent: Apr. 12, 1994

[54] CHECK VALVE AND METHOD OF ASSEMBLY

[75] Inventor: Richard C. Gasaway, Pearland, Tex.
[73] Assignee: Gulf Valve Company, Houston, Tex.
[21] Appl. No.: 41,163
[22] Filed: Apr. 1, 1993
[51] Int. Cl.⁵ .............................................. F16K 15/03
[52] U.S. Cl. ...................................... 137/15; 137/318; 137/512.1
[58] Field of Search ........................ 137/15, 315, 512.1

[56] References Cited

U.S. PATENT DOCUMENTS

| | | | |
|---|---|---|---|
| 2,877,792 | 3/1959 | Tybus | 137/512.1 |
| 3,678,958 | 7/1972 | Satterwhite | 137/512.1 |
| 4,079,751 | 3/1978 | Partridge et al. | 137/512.1 X |
| 4,257,451 | 3/1981 | Paton | 137/512.1 |
| 4,694,853 | 9/1987 | Goodwin | 137/512.1 |
| 4,896,695 | 1/1990 | Pysh | 137/512.1 |
| 4,977,926 | 12/1990 | Hocking | 137/512.1 |

OTHER PUBLICATIONS

"Brochure (8 pages) of Wafer Check Valve of Marlin Valve Company, Inc., Houston, Texas, designated as 10M-C11-87 published 1987".

"Advertisement (3 pages) of Hinged Valve of Techno Corporation, Erie, Pa. designated as MH(10M) 1/88 published 1988".

*Primary Examiner*—Robert G. Nilson
*Attorney, Agent, or Firm*—Bush, Moseley & Riddle

[57] ABSTRACT

A check valve (10) and method of assembling semicircular valve discs (38, 40) within blind openings (28, 30) in the valve body (12). A hinge pin (46) for the semicircular valve discs (38, 40) is of a length less than the diameter of the flow passage through the valve body (12) and has sleeves (52) mounted thereon for relative movement between a retracted position for insertion within the valve body (12) and a projected position within the blind openings (28, 30) for supporting the hinge pin (46) and discs (38, 40). A subassembly comprising the hinge pin (46), the semicircular valve discs (38, 40), spring (48), snap rings (60), and sleeves (52) is first formed and then inserted within the valve body (12).

15 Claims, 3 Drawing Sheets

CHECK VALVE AND METHOD OF ASSEMBLY

FIELD OF THE INVENTION

This invention relates to a check valve and the method of assembly, and more particularly to such a check valve and method of assembly in which the check valve includes a pair of generally semicircular valve discs mounted on a hinge pin supported by the valve body.

BACKGROUND OF THE INVENTION

Check valves of the general type illustrated herein comprise a pair of generally semicircular valve discs or flaps which are mounted on a shaft or hinge pin for pivotal movement between open and closed positions relative to the flow passage through the valve body. In many instances heretofore, the hinge pin has been mounted in opposed openings in the valve body which extend through the valve body. Normally, removable plugs have been positioned in the openings after the assembly of the valve. At times, particularly after prolonged use, a possible leak path may occur through the openings about the plugs. Thus, it is highly desirable that the hinge pin be supported by the valve body without the use of any openings through the valve body thereby to eliminate any possible leakage through the valve body from openings for the support of the hinge pin. Also, certain specifications and standards require that no through openings be provided in the valve body.

Check valves have been provided heretofore in which the hinge pin is supported by means not extending through the valve body. For example, U.S. Pat. No. 4,896,695 dated Jan. 30, 1990 shows a check valve in which the hinge pin is supported by opposed lugs secured to the valve seat on the valve body. However, such an arrangement requires that the check valve discs must be contoured to receive the lugs since the valve discs do not seat about a complete circle on the valve seat.

U.S. Pat. No. 4,977,926 dated Dec. 18, 1990 likewise shows a check valve in which the hinge pin is supported on opposed clips which are mounted within recesses or slotted areas in the valve body which do not extend through the valve body. The clips include resilient fingers and the slotted areas are machined in the valve body bore to form the recesses for the clips.

SUMMARY OF THE PRESENT INVENTION

The present invention is directed to a check valve having a pair of generally semicircular valve discs or flaps pivotally mounted on a hinge pin supported within opposed blind openings in the valve body. The internal bore in the valve body is not slotted and no mounting members are secured to the valve seat. The pivoted valve discs of the present invention are easily preassembled with the hinge pin and the preassembly is then installed within the blind openings to mount the semicircular valve discs within the valve body for 360° sealing and seating against the annular valve seat within the valve body.

To accomplish the above, a hinge pin is provided of a length less than the diameter of the flow passage in the valve body, and a slidable concentric support sleeve or bushing is mounted on each end of the hinge pin. The supporting sleeves are mounted on the hinge pin for relative sliding movement between a projected position extending beyond the ends of the hinge pin within opposed blind openings in the valve body for supporting the pin and a retracted position withdrawn from the opposed blind openings to permit assembly and disassembly of the hinge pin and associated semicircular valve discs.

For assembly of the check valve within the valve body, the valve body is first formed with a pair of opposed blind openings for the hinge pin and a pair of opposed blind openings for a parallel stop pin. The hinge pin and stop pin are each of a length less than the diameter of the flow passage in the valve body. The concentric sleeves are first slipped into the lugs for the two semicircular valve discs and the hinge pin is then received within the lugs and sleeves. The sleeves are moved to a retracted position with the outer ends of the sleeves not projecting from the pins.

The subassembly of the hinge pin with the semicircular discs and retracted sleeves thereon is then inserted within the flow passage until the hinge pin and sleeves are axially aligned with the associated pair of opposed blind openings in the valve body. Then, the sleeves are moved outwardly from the ends of the hinge pin into the blind openings to form support sleeves for the hinge pin. Snap rings are then engaged behind the sleeves to retain the sleeves in projected position within the blind openings. Next, the stop pin with retracted sleeves thereon is axially aligned with the other associated pair of blind openings and the sleeves extended into the openings for mounting the stop pin in a similar manner.

It is an object of this invention to provide a check valve having a pair of semicircular valve discs that may be mounted on a hinge pin within a valve body without any openings extending through the valve body thereby to minimize possible fluid leak paths.

It is another object of this invention to provide such a check valve having a pair of generally semicircular valve discs which are mounted on a hinge pin supported within opposed generally cylindrical blind openings in the valve body.

It is still further object of this invention to provide a method of assembling a check valve in which a subassembly including a hinge pin and semicircular valve discs may be inserted within the flow passage in a valve body and easily assembled within the valve body in a minimum of time.

Other objects, features, and advantages of this invention will become more apparent after referring to the following specification and drawings.

DESCRIPTION OF THE INVENTION

Figure 1:
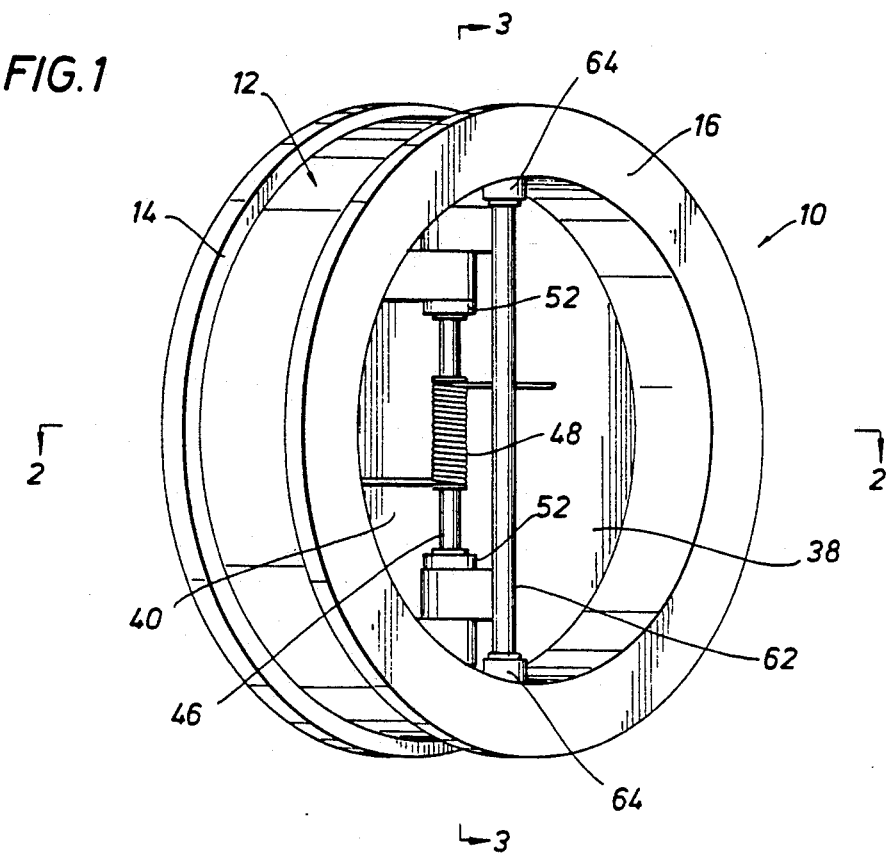
FIG. 1 is a perspective of the check valve comprising the present invention removed from the flow line and showing the check valve in a closed position.
Figure 2:
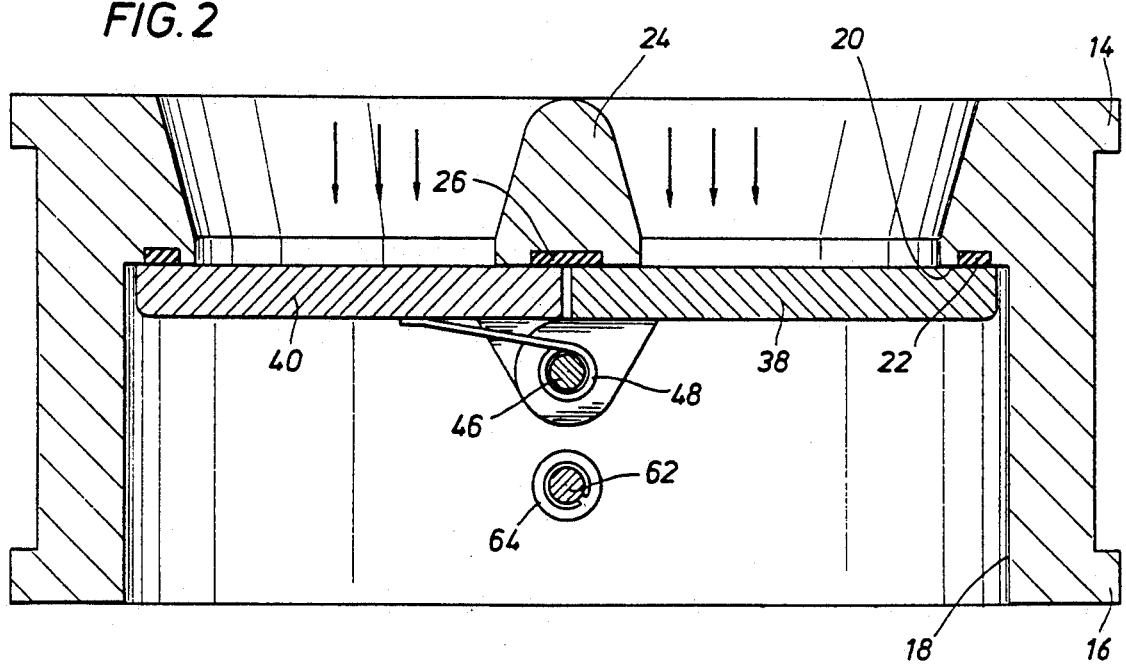
FIG. 2 is a transverse sectional view of the check valve taken generally along line 2—2 of FIG. 1.
Figure 3:
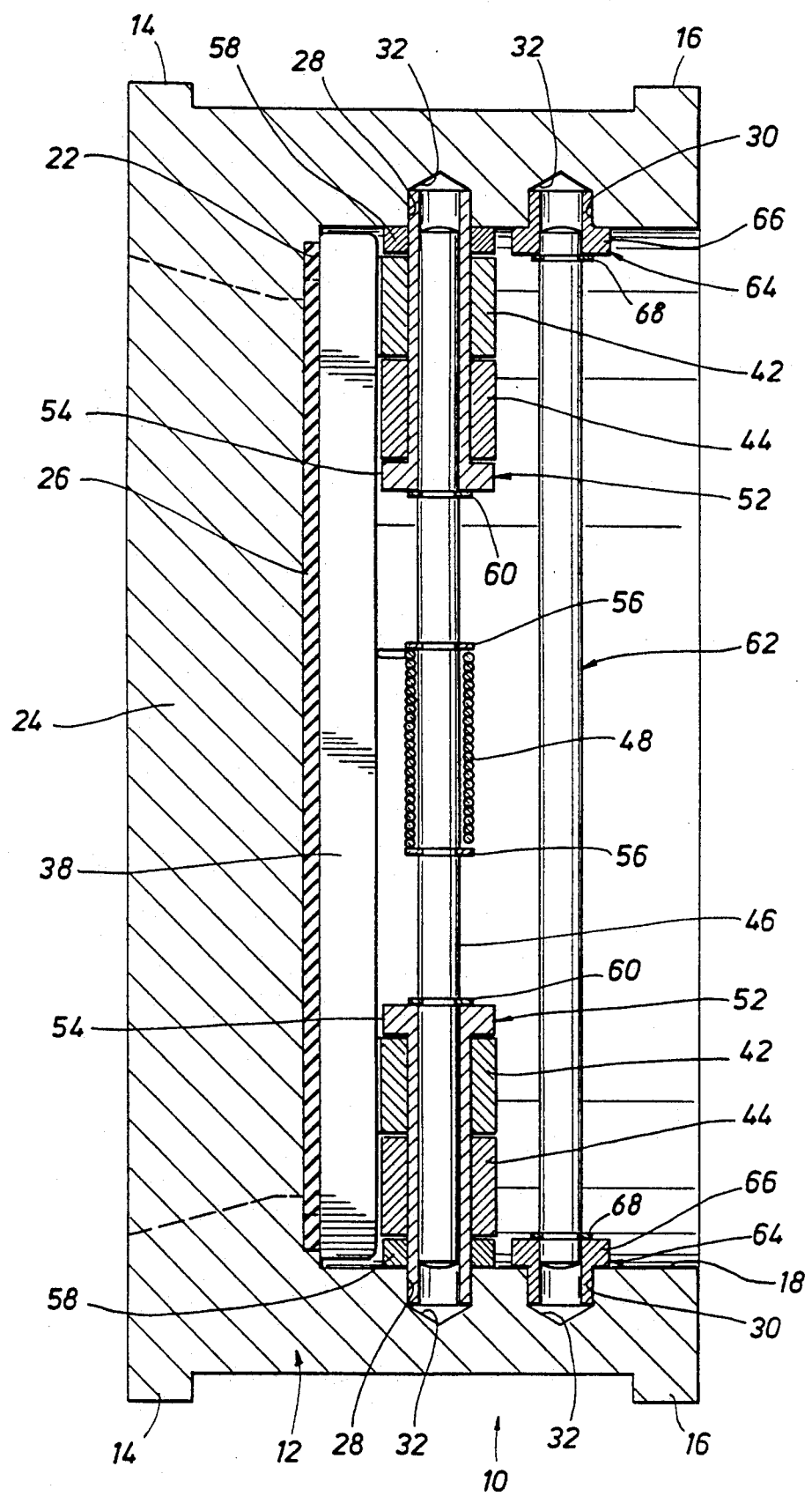
FIG. 3 is a longitudinal sectional view of the check valve taken generally along line 3—3 of FIG. 1.
Figure 4:
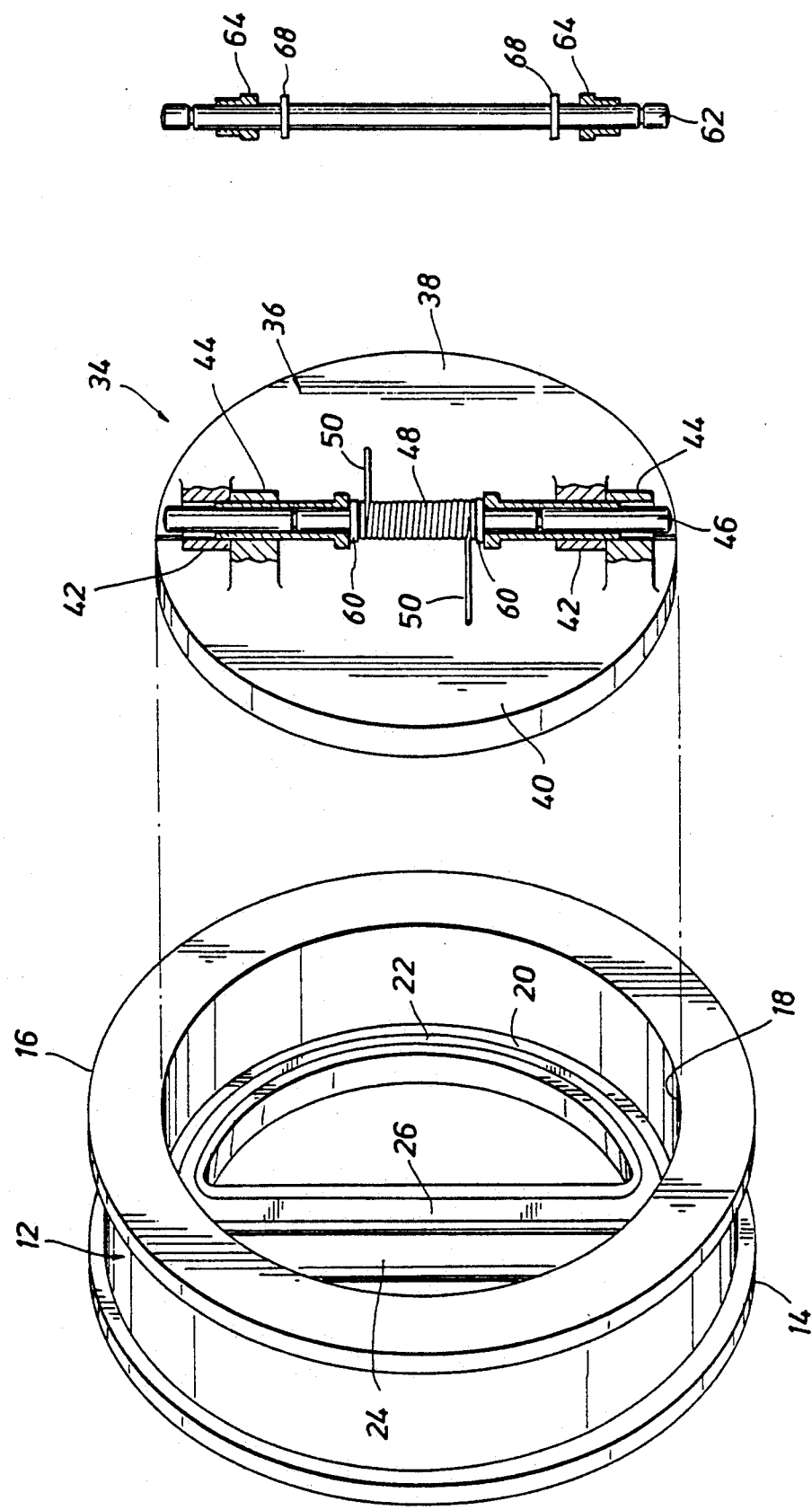
FIG. 4 is a sectional view similar to FIG. 3 but showing a subassembly of the semicircular valve discs and hinge pin prior to insertion within the valve body for assembly, the subassembly being further shown in an exploded relation.

Referring now to the drawings for a better understanding of this invention, the check valve is shown generally at 10 having an integral valve body 12 with flanges 14 and 16 at the ends of body 12. Body 12 is adapted for mounting within a flow line (not shown) with flange 14 being on the upstream side and flange 16 being on the downstream side. Body 12 is normally clamped in abutting relation to ends of the associated flow line. In some instance, flanges 14, 16 may be provided with suitable aligned openings to receive mounting bolts.

Body 12 has an inner peripheral surface 18 defining a central bore and an annular shoulder 20 forms a valve seat. Seat 20 has an annular resilient seal 22 mounted within a groove in seat 20. Seal 22 may, if desired, be vulcanized to the valve body. Also it may be desirable in some instances to provide a metal to metal seal in lieu of the resilient seal particularly for high temperatures and for particular ladings being transported in the associated flow line. A rib or post 24 of valve body 12 extends diametrically across the flow passage to form a valve support member and has a resilient seal 26 along its length formed integrally with seal 22. Valve body 12 is formed with two pairs of opposed aligned blind openings 28 and 30 of a generally cylindrical shape having bottoms 32.

A valve subassembly generally indicated at 34 is provided for installation or assembly within valve body 12. Valve subassembly 34 includes a check valve member generally indicated at 36 and comprising a pair of semicircular or half valve discs 38, 40 having respective apertured lugs 42, 44 for receiving a mounting shaft or hinge pin 46. A torsion spring 48 mounted about hinge pin 46 has opposed ends 50 engaging semicircular discs 38, 40 to urge discs 38, 40 continuously in a direction toward seat 20 for holding discs 38, 40 in a tight sealing relation against resilient seal 22 in the closed position thereof. Hinge pin 46 is of a length slightly less than the diameter of the flow passage defined by valve body 12 to permit insertion of pin 46 within valve body 12 to a position in axial alignment with opposed blind openings 28. A pair of end sleeves or support bushings 52 having inner flanges 54 are fitted about hinge pin 46 and are mounted for movement between a retracted position on pin 46 for alignment with openings 28 and a projected position extending within openings 28 in an assembled supporting position of valve discs 38, 40.

To form subassembly 34 for installation, sleeves 52 are first inserted within lugs 42, 44 of semicircular valve discs 38, 40. Then, pin 46 is inserted within one of the sleeves 52 and spring 48 along with snap rings 56, 60 are then inserted over the extending free end of pin 46. Next, pin 46 is inserted within the other sleeve 52. Thrush washers 58 may then be positioned on the ends of pin 46 and snap rings 56 engaged with pin 46. With subassembly 34 thus formed, subassembly 34 is inserted within the bore of valve body 12 until sleeves 52 and pin 46 are axially aligned with blind openings 28. Then, sleeves 52 are moved radially outwardly within thrush washers 58 and openings 28. Snap rings 60 are engaged with pin 46 adjacent end flanges 54 on sleeves 52 to hold sleeves 52 in extended position within openings 28 for supporting hinge pin 46 and valve discs 38, 40.

A stop pin 62 to limit the pivotal movement of discs 38, 40 is of a length slightly less than the diameter of the flow passage through valve body 12 and support sleeves or bushings 64 having inner flanges 66 are mounted on stop pin 62 with snap rings 68 holding sleeves 64 in an extended position. After installation of subassembly 34, stop pin 62 with sleeves 64 thereon in a retracted position is inserted within valve body 12 to position sleeves 64 in axial alignment with openings 30. Then, sleeves 64 are moved to an extended position within openings 30 to support stop pin 62 within openings 30. Snap rings 68 are then positioned on pin 62 to hold sleeves 64 in extended position with flanges 64 in abutting relation to valve body 12.

From the above, it is apparent that a check valve and method of assembly have been provided in which no through openings are provided in the valve body for mounting of the pivoted valve members thereby to minimize possible leakage. Further, no slots or special recesses are formed in the central bore or flow passage of the valve body to receive special mounting members for the hinge pin. All that is required for mounting of the hinge pin on the valve body are a pair of opposed blind openings in the valve body which are easily drilled in a minimum of time.

While retractable sleeves about hinge pin 46 have been shown as supporting hinge pin 46 within openings 28, it is to be understood that other retractable supporting members could be utilized for supporting and releasably retaining pin 46 within openings 28. For example, a single retractable sleeve could be used or retractable keys mounted within aligned keyway slots in the pin and valve body could also be utilized. Pin 46 could also be provided with retractable end portions, if desired, that would releasably fit within openings or recesses in the valve body.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A method of assembling a check valve comprising the following steps:
   providing a valve body having a central flow passage therethrough;
   forming a pair of aligned opposed openings in the valve body communicating with said flow passage;
   forming a subassembly including a hinge pin of a length less than the diameter of the flow passage in the valve body, a pair of semicircular valve discs mounted for pivotal movement on said pin, and a pair of extensible support members about the ends of said pin;
   mounting said extensible support members on said pin for generally axial movement between a retracted position with the outer ends of said extensible support members not projecting substantially beyond the ends of said pins and a projected position with the outer ends of said support members extending substantially beyond the ends of said pin for supporting said pin;
   inserting said subassembly within said valve body with said support members in a retracted position and aligning said pin and support members with said pair of aligned openings; and
   then moving said support members outwardly within said openings for supporting said pin and said semicircular valve discs thereon for pivotal movement of said semicircular valve discs between open and closed positions relative to said flow passage.

2. The method as set forth in claim 1 including the following steps:

providing a stop pin of a length less than the diameter of the flow passage in the valve body;

mounting a pair of support members on opposed ends of said stop pin for movement between a retracted position with the outer ends of said support members not projecting substantially beyond the ends of said stop pin and a projected position with the outer ends of said support members extending substantially beyond the ends of said stop pin;

forming another pair of aligned opposed openings in the valve body adjacent said first mentioned pair of openings;

inserting said stop pin with said support members in a retracted position within said valve body and aligning said stop pin and support members with said second pair of aligned openings; and then moving said support members outwardly within said second pair of aligned openings for supporting said stop pin thereon.

3. The method of assembly as set forth in claim 1 including the following steps:

providing a pair of spaced apertured lugs on each semicircular valve disc; and mounting said support members within said apertured lugs for forming said subassembly.

4. A method of assembling a check valve comprising the following steps:

providing a valve body having a central flow passage therethrough;

forming a pair of aligned opposed oenings in the valve body communicating with said flow passage;

forming a subassembly including a hinge pin of a length less than the diameter of the flow passage in the valve body, a pair of semicircular valve discs mounted for pivotal movement on said pin, and extensible support means carried by said hinge pin;

mounting said extensible support means on said pin for axial movement between a retracted position with the outer ends of said extensible support means not projecting beyond the diameter of said flow passage and an extended position with the outer ends of said extensible support means extending substantially beyond the diameter of said flow passage for supporting said pin;

inserting said subassembly within said valve body with said extensible support means in a retracted position and aligning said pin and extensible support means with said pair of aligned openings; and then moving said extensible support means outwardly within said openings for supporting said pin and said semicircular valve discs thereon for movement between open and closed positions relative to said flow passage.

5. The method as set forth in claim 4 including the following steps:

providing a stop pin of a length less than the diameter of the flow passage in the valve body;

mounting a pair of end members on opposed ends of said stop pin for axial movement between a retracted position with the outer ends of said end members not projecting substantially beyond the ends of said stop pin and a projected position with the outer ends of said end members extending substantially beyond the ends of said stop pin;

forming another pair of aligned opposed openings in the valve body adjacent said first mentioned pair of openings;

inserting said stop with said end members in a retracted positions thereon within said valve body and aligning said stop pin and end members with said second pair of aligned openings; and then moving said end members outwardly within said second pair of aligned openings for supporting said stop pin thereon.

6. A check valve comprising:

a generally cylindrical valve body having a flow passage therethrough;

a pair of opposed aligned openings in said valve body communicating with said flow passage;

a generally cylindrical sleeve in each opening extending radially inwardly of the flow passage;

a hinge pin of a length less than the diameter of said flow passage having ends supported by said sleeves within said aligned openings with said sleeves adapted for relative longitudinal movement along said hinge pin during assembly and disassembly of said check valve; and a pair of generally semicircular valve discs mounted on said hinge pin for pivotal movement between open and closed positions relative to said flow passage.

7. A check valve set forth in claim 6 wherein each of said semicircular valve disc has a pair of spaced apertured lugs thereon fitting about said hinge pin.

8. A check valve comprising:

a generally cylindrical valve body having a flow passage therethrough;

a pair of opposed openings in said valve body communicating with said flow passage and being of a generally cylindrical shape defining a bottom;

a pin support member in each opening extending radially inwardly of the flow passage;

a hinge pin of a length less than the diameter of said flow passage having ends supported on said pin support member in said aligned openings;

means mounting said pin support members on the ends of said hinge pin for movement between a retracted position with the outer ends of said pin support members not projecting substantially beyond the ends of said pin and a projected position with the outer ends of said pin support members extending within said pair of openings a substantial distance for supporting said pin; and a pair of generally semicircular valve discs mounted on said hinge pin for pivotal movement between open and closed positions relative to said flow passage 9. A check valve as set forth in claim 8 wherein said in support members comprise sleeves fitting about said hinge pin.

10. A check valve as set forth in claim 9 wherein each of said valve disc has a pair of apertured lugs thereon fitting in concentric relation about the sleeves on opposite ends of said hinge pin.

11. A check valve as set forth in claim 10 wherein each of said sleeves has an inner flange thereon abutting a lug on a semicircular valve disc.

12. A check valve as set forth in claim 9 wherein releasable securing means secure said sleeves in a projected position extending within said openings.

13. A check valve as set forth in claim 12 wherein said releasable securing means comprise snap rings.

14. A check valve comprising:

a generally cylindrical valve body having a flow passage therethrough;

a first pair of opposed aligned openings in said valve body communicating with said flow passage;

a pin support member in each opening extending radially inwardly of the flow passage;

a hinge pin of a length less than the diameter of said flow passage having ends supported by said pin support members within said first pair of aligned openings;

a pair of generally semicircular valve discs mounted on said hinge pin for pivotal movement between open and closed positions relative to said flow passage;

a second pair of opposed aligned openings in said valve body adjacent said first pair of aligned openings;

a pin support member in each of said second pair of openings extending radially inwardly of said flow passage; and a stop pin of a length less than the diameter of said flow passage supported by said pin support members within said second pair of openings.

15. A check valve as set forth in claim 14 wherein each of said openings for said hinge pin and said stop pin is a blind generally cylindrical opening defining a bottom.

* * * * *